United States Patent [19]
Morris et al.

[11] Patent Number: 5,349,471
[45] Date of Patent: Sep. 20, 1994

[54] HYBRID REFRACTIVE/DIFFRACTIVE ACHROMATIC LENS FOR OPTICAL DATA STORAGE SYSTEMS

[75] Inventors: G. Michael Morris, Fairport; David Kay, Rochester, both of; Dale Buralli, both of Rochester, all of N.Y.; David Kubalak, Somerville, Mass.

[73] Assignee: The University of Rochester, Rochester, N.Y.

[21] Appl. No.: 17,712

[22] Filed: Feb. 16, 1993

[51] Int. Cl.⁵ .................. G02B 3/08; G02B 5/18; G02B 27/44
[52] U.S. Cl. .................. 359/565; 359/566; 359/569; 359/571
[58] Field of Search .......... 359/355, 356, 357, 565, 359/566, 569, 571; 369/109

[56]   References Cited
U.S. PATENT DOCUMENTS

| | | | |
|---|---|---|---|
| 4,768,183 | 8/1988 | Ohnishi et al. | |
| 5,044,706 | 9/1991 | Chen | |
| 5,078,513 | 1/1992 | Spaulding et al. | |
| 5,117,306 | 5/1992 | Cohen | |
| 5,117,433 | 5/1992 | Tatsuno et al. | |
| 5,148,314 | 9/1992 | Chen | 359/565 |
| 5,151,823 | 9/1992 | Chen | 359/565 |
| 5,155,553 | 10/1992 | Chen | 359/565 |
| 5,157,555 | 10/1992 | Reno | 359/565 |
| 5,161,040 | 11/1992 | Yokoyama et al. | 359/565 |
| 5,161,057 | 11/1992 | Johnson | |
| 5,229,880 | 7/1993 | Spencer et al. | 359/357 |

FOREIGN PATENT DOCUMENTS

WO91/12551 8/1991 PCT Int'l Appl.

OTHER PUBLICATIONS

Goto et al, Proc. Int. Symp. on Optical Memories–Japanese J. Appl. Phys, vol. 26 (1987), p. 135.
Tanaka et al, J.P. Nat. Toch. Repts, vol. 35, No. 2, (Apr. 1989).

*Primary Examiner*—Martin Lerner
*Attorney, Agent, or Firm*—M. LuKacher

[57]    ABSTRACT

A diffractive/refractive hybrid lens for use in an optical data storage system as an objective is provided by a convex-plano singlet having a refractive element defined by plano-convex surfaces and a diffractive element defined by a Fresnel zone-like pattern on the plano surface which together provide the total power of the lens. The refractive lens is made of a high index, high dispersion glass so that the curvature and thickness of the refractive lens is minimized while providing a large numerical aperture (at least 0.45) at the expense of increased longitudinal chromatic aberration, which are compensated by the diffractive element and without the need for one or more additional curved surfaces as in low index biaspheric glass objective lenses for chromatic and mono-chromatic aberration reduction, which increases the thickness and curvatures of the lens. The invention enables longitudinal chromatic aberration to be corrected for at least a 10 nm band width around a center wavelength over a 20 nm range, as results when different lasers are used and as laser power varies during optical data storage on an optical data storage device (an optical disk). The thin, light weight low curvature achromat has maximum tolerance for various possible manufacturing errors such as decentering, variations in thickness of the lens, tilt and focal length especially for on-axis field of view less than 2° while providing a very high quality spot (Strehl ratio of at least 0.9.).

6 Claims, 4 Drawing Sheets

| SURFACE | RADIUS (mm) | THICKNESS (mm) | $n_m$ |
|---|---|---|---|
| 1 | 2.49707 | 2.12209 | |
| | | | 1.795 |
| 2 | INF | 0.0 | |
| | | | DIFF. SURFACE |
| 3 | INF | 1.10059 | |
| | | | 1.0 |
| 4 | INF | 1.20000 | |
| | | | 1.573 |
| 5 | INF | 0.0 | |

FIG. 8

| | 2nd ORDER | 4th ORDER | 6th ORDER | 8th ORDER | 10th ORDER |
|---|---|---|---|---|---|
| ASPHERIC COEFF. D | -- | $-0.00380 \frac{1}{mm^3}$ | $-0.00054 \frac{1}{mm^5}$ | $-5.149E\text{-}05 \frac{1}{mm^7}$ | $-3.337E\text{-}05 \frac{1}{mm^9}$ |
| PHASE COEFF. A | $-0.01319 \frac{1}{mm}$ | $0.003036 \frac{1}{mm^3}$ | $-7.3356E\text{-}04 \frac{1}{mm^5}$ | $-6.6266E\text{-}04 \frac{1}{mm^7}$ | $1.8276E\text{-}04 \frac{1}{mm^9}$ |

FIG. 9

HYBRID REFRACTIVE/DIFFRACTIVE ACHROMATIC LENS FOR OPTICAL DATA STORAGE SYSTEMS

The present invention relates to hybrid refractive/diffractive lenses and particularly to a refractive/diffractive achromat which is especially suitable for use in optical data storage or recording systems which use laser light from a laser diode to write and read data on an optical storage medium such as an optical disk.

In optical data storage systems, the spot of light needed to write and read must be extremely small and the lens that focuses the light must be well corrected for aberrations. It is not enough for a lens to be corrected for its own aberrations, the lens must also be corrected for wavelength shift in the laser. For each color or wavelength of light incident on the lens, the lens will have a different focal length. This is referred to longitudinal chromatic aberration. While automatic refocusing mechanisms of optical data storage systems can correct for slow wavelength changes, individual lasers, especially laser diodes used in optical data storage systems shift wavelength almost instantaneously. For example, the laser beam shifts in wavelength with output power by approximately 0.08 nm/mW. Laser diodes also mode hop with power changes. This effect is especially significant during digital recording. In addition, laser diodes operating at constant output power tend to mode hop (the longitudinal modes) with very small amounts of optical feedback, as low as a few tenths of a percent. While such mode hopping may be tolerated when the system is used for reading (in read optical heads), in writing or recording, the focus tolerance is tighter and focus shifts affect the quality (introduce errors) in the recorded data.

Current designs for optical recording objective lenses use low dispersion, low index of refraction glass to minimize longitudinal chromatic aberration. Low dispersion biaspheric glass objective lenses are used in lower cost systems. Multi-element lenses are used to provide chromatic aberration correction in multi-element more costly lens systems and the multi-element lenses generally have shorter working distances (the distance between the lens and the optical disk surface). Moreover, in order to reduce the difficulty of correcting for chromatic aberration, lens designs have been driven in the direction of reducing dispersion (using low index, high Abbe number glass). Higher curvature, thicker lenses have therefore been required. Such lenses are more difficult to manufacture, since they are more sensitive to variations in lens thickness, wedge, and decentering. Such lenses can also sacrifice weight and size in order to achieve low chromatic aberration, for example singlet lenses require strong biaspheric surfaces.

In an effort to alleviate mono-chromatic aberration without a second surface with power, it has been proposed to use a grating. See K. Goto, et al., "Spherical Grating Objective Lenses for Optical Disk Pick-Ups", Proc. Int. Sym. on Optical Memories (1987)—Japanese Journal of Applied Physics, Vol. 26 (1987) Supplement 26-4. The singlet described in the Goto et al. article utilizes moderate optical material (plastic) for 0.45-0.5 N.A. lenses that require hundreds of zones in the diffractive element. The grating is not designed to correct for chromatic aberration.

Although various patents and publications have discussed the use of diffractive elements to compensate for chromatic aberration (See Ohnishi, U.S. Pat. No. 4,768,183, Aug. 30, 1988; International Patent Publication WO 91/12551, Aug. 22, 1991; U.S. Pat. No. 5,117,433, May 26, 1992; U.S. Pat. No. 5,044,706, Sep. 3, 1991; U.S. Pat. No. 5,078,513, Jan. 7, 1992, U.S. Pat. No. 5,117,306, May 26, 1992; U.S. Pat. No. 5,161,057, Nov. 3, 1992), designs for optical recording objective lenses have consistently used low index, low dispersion glass in order to minimize chromatic aberration. See also Tanaka, et al., "A Spherical Molded Glass Lens of Super-low Chromatic Aberration", JP Nat. Tech. Repts. Vol. 35, No. 2, April 1989.

The present invention deviates from the conventional wisdom in the field of optical data storage/recording objective lenses and utilizes high index high dispersion glass, thereby loosening manufacturing tolerances with respect to alignment of the lens in the data storage system (tilt, etc.) and in the lens itself (glass element thickness, focal length, etc.), and obtaining a thinner, lens. It has been discovered in accordance with the invention that the increased chromatic aberration resulting from the use of the high index high dispersion material for the refractive element of the lens can be corrected by a diffractive element which is incorporated into the lens thereby providing an improved hybrid refractive/diffractive achromatic for optical data storage applications.

The invention provides an improved optical data storage objective lens which is suitable not only for reading but also writing information on an optical data storage media which has: (a) high NA; (b) high Strehl ratio (high quality spot) at the recording surface; (c) chromatic correction; (d) a long working distance (air space) between the front surface of the lens and the optical recording medium, (e) small size and light weight to facilitate mechanical focusing and tracking of the head; and (f) on axis field of view of less than 2°.

Laser diodes used in optical recording applications are subject to wavelength shifts of for example up to 10 nm band-width, over a 20 nm wavelength range (e.g., ±5 nm from 770 nm to 790 nm). A hybrid refractive/diffractive achromat objective in accordance with the invention provides chromatic correction over such a range.

The foregoing and other objects, features and advantages of the invention will become more apparent from a reading of the following description in connection with the accompanying drawings in which:

FIG. 8 is a table showing a lens design for the surfaces indicated in FIG. 1; and FIG. 9 is a table showing exemplary surface data for surface 1, the aspheric surface and surface 3, the diffractive surface shown in FIG. 1. The phase coefficients A are from equation (3) and the aspheric coefficients D are from equation (11), the units being defined in FIG. 9 and E being an exponent.

Figure 1:
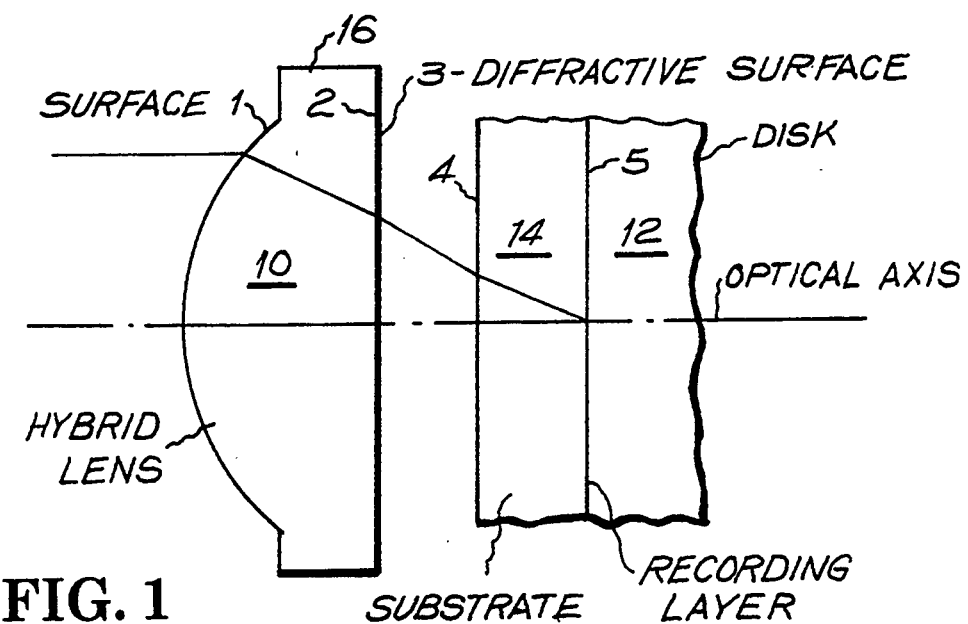
FIG. 1 is a schematic diagram of a diffractive/refractive hybrid lens in accordance with the invention shown adjacent to an optical disk, the lens having a curved surface 1 and a grating or diffractive surface 3, the features on the diffractive surface being too small to be seen on the scale of the Figure.
Figure 2:
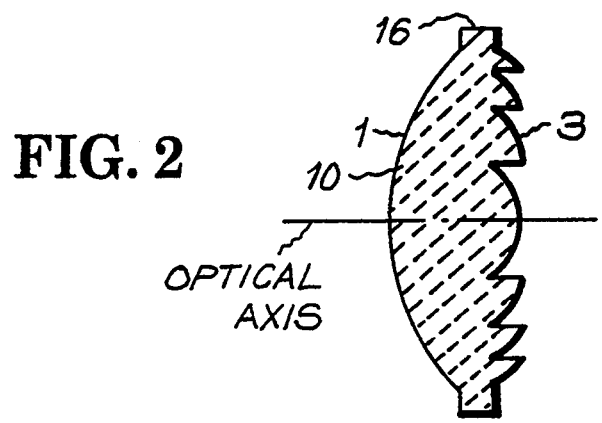
FIG. 2 is a sectional view of the lens shown in FIG. 1 but the diffractive surface features are greatly magnified.

Referring to FIG. 1 there is shown a diffractive/refractive hybrid lens 10 for use in an optical data storage system having an optical disk substrate 14 of transparent plastic, such as polycarbonate. The lens 10 is a plano convex singlet having a curved surface 1 and a Fresnel zone pattern on the plano surface 3 of the lens body which is the surface opposite to the curved surface. Both surfaces are perpendicular at the optical axis of the lens. The refractive lens is made from optically transmissive material having a high index of refraction of at least 1.65. Suitable material is flint glass, such as LaF glass. FIG. 2 shows the lens 10 and emphasizes its curved surface which defines the refractive element as well as the Fresnel zone pattern which defines the surface 3 and the diffractive element. An annular ring 16 is part of the lens body and is merely for attachment and location in a barrel of an optical head used in the optical data storage system. The overall thickness of the lens may be about 2.12 mm (millimeters). The radius of the curved surface may be about 2.5 mm to a point along the optical axis on the right of that surface. Exemplary dimensions and spacings are set forth in FIG. 8. In FIG. 8 the index is at the center of range ($n_m$); being measured at 780 nm. The depth of echelons in the zones is exaggerated in FIG. 2 and may be of the order of a micron and the spacing between the zones on the order of tens of microns.

Although the diffractive element can be added to the curved surface 1, it is preferable that the diffractive elements be formed on the plano surface.

The achromat is effectively a singlet in size, but is in effect a doublet in that the refractive and diffractive elements work together to add to the final total power.

Table I, which will be discussed in greater detail below, shows that 95% of the total power of the achromat is in the refractive element. It therefore behaves much like a singlet. The diffractive surface compensates for longitudinal chromatic aberration, but also, because of introduction of higher order terms (4th order, 6th order, 8th order and 10th order—see FIG. 9) in the phase function (equation (3)) of the diffractive surface 3, mono-chromatic aberrations, such as spherical aberration and coma are also substantially corrected.

Consider the design of the diffractive surface 3. The design takes advantages of the wave nature of light. Light travels in waves, which can interfere. If the waves interfere such that the peaks and valleys coincide, the energy in the two waves adds to each other; this is referred to as constructive interference. Note that if one of the waves is delayed exactly one or more wavelengths behind the other, then it is once again in phase, and they will interfere constructively. If the waves line up out of phase, the energy in one wave will cancel the energy in the other; this is referred to as destructive interference.

Figure 3:
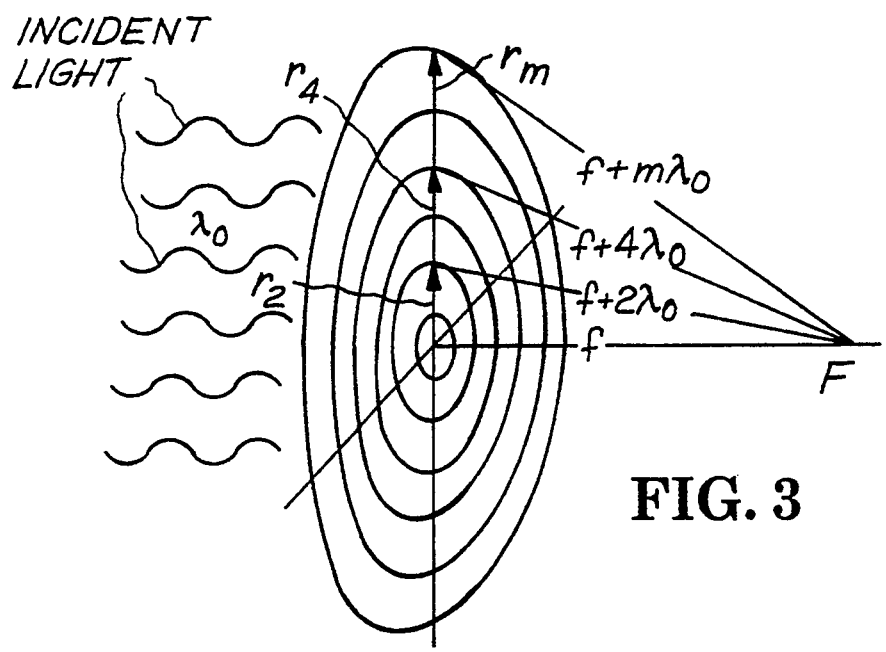
FIG. 3 is a diagrammatic, perspective view of a Fresnel zone pattern which may be formed as by blazing on the diffractive surface of the lens shown in FIGS. 1 and 2, where $\lambda_o$ is the design wavelength, m is an integer greater than 0, f is the focal length and F designates the focal point.

To design the diffractive surface, a Fresnel zone pattern is used, as shown in FIG. 3. A focal point, F, is designated at a distance, f, from the center of the pattern. This distance is equal to the focal length. The rings, or zones, are spaced such that the edge of each zone is exactly one wavelength further away from the point F. This way, light passing through the pattern at the edges of the zones will be in phase and constructively interfere at the point F.

Using right triangles, an equation can be derived that gives the radii of the zones as a function of the focal length (distance from the pattern to F) and the wavelength of light used to design the pattern:

$$r^2m + f^2 = (f + m\lambda_o)^2. \tag{1}$$

using the fact that the wavelength of light is much smaller than the focal length, Eq. (1) can be reduced to $$r^2m = 2m\lambda_o f. \tag{2}$$

From Eq. (2), it can be seen that the diffractive surface has a strong dependence on the wavelength of light used to construct the zones. If the wavelength of light incident on the diffractive surface deviates from the design wavelength, the focal length also changes. This is an important property when the diffractive surface is used to achromatize the refractive element.

Figure 4:
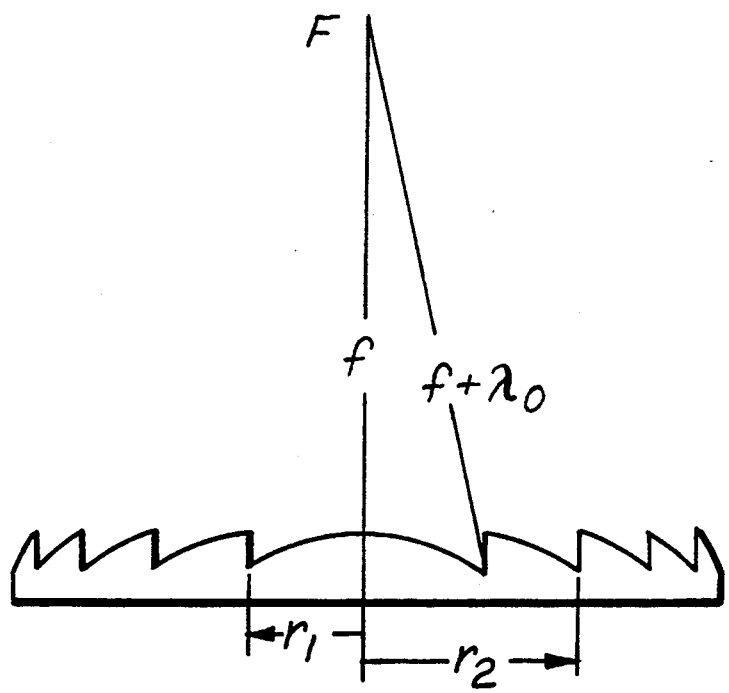
FIG. 4 is a greatly enlarged side view of the diffractive surface of the lens shown in FIGS. 1 and 2 showing the surface blaze profile of a few zones, the actual thickness being of the order of microns and the spacing between the zones actually being of the order of tens of microns.

Although the light at the edge of zone is in phase when it gets to the focal point F, the light coming through the middle of each of the zones is not yet in phase, and therefore will not interfere constructively. To correct this problem, material is added in the middle of the zones to delay the phase just enough so that at the point F, all the light coming through the surface constructively interferes. This blaze is shown in FIG. 4.

In the center of the zone pattern, where the material is the thickest, the light is delayed exactly one wavelength. Moving away from the center of the pattern, the distance from the focal point increases so that less material is needed. The material is gradually thinned to a minimum at the edge of the first zone, where no additional delay is needed, because the distance at the edge of the first zone is one wavelength further from the focal point than the center of the ring pattern. Again material is added to delay the light exactly one wavelength, but the light is still in phase. Since the material is once again thick, the process starts over. This way all the light passing through the diffractive surface will be in phase and constructively interfere at the focal point. In general, the phase delay introduced by such a surface can be described with Eq. (3):

$$\Phi = \frac{2\pi}{\lambda_o}(A_2 r^2 + A_4 r^4 + A_6 r^6 + A_8 r^8 + A_{10} r^{10}). \tag{3}$$

For now, $A_2 = 1/(2F)$, and $A_4$, $A_6$, etc. $= 0$. Giving value to the higher order phase terms, $A_4$, $A_6$, etc., has the same advantage as introducing aspherical terms for a glass surface, and is useful for minimizing monochromic aberrations. Whenever $\Phi$ is equal to an integer multiple of $2\pi$, r is the radius of a new zone.

Using Eq. (3), it is possible to design a diffractive surface that is nearly 100% efficient at the desired focal point. The efficiency changes, however, with change in the wavelength of incident light, in a manner described by $$\eta(\lambda) = \frac{\sin\left[\pi\left(\frac{\lambda_o}{\lambda} - 1\right)\right]}{\left[\pi\left(\frac{\lambda_o}{\lambda} - 1\right)\right]} \quad (4)$$

where $\lambda_o$ is the design wavelength and $\lambda$ is the incident wavelength. For a design wavelength of $\lambda_o = 0.780$ μm, the efficiency as a function of wavelength is plotted in FIG. 5.

Figure 5:
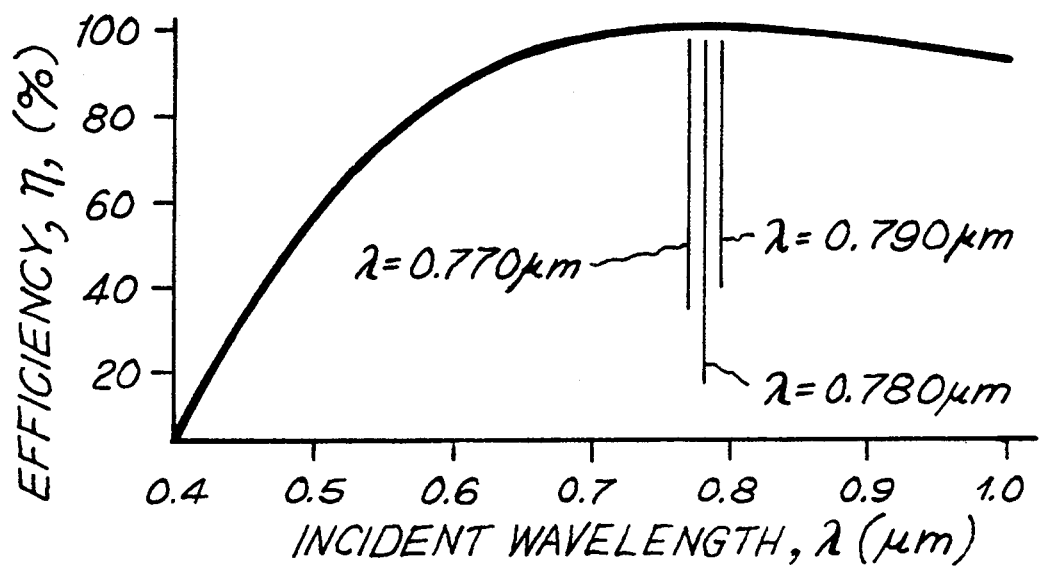
FIG. 5 is a plot of the efficiency of the lens for design wavelength $80_o$ of 780 nm and showing the boundaries of a 20 nm wavelength range.

To account for variations in the center wavelength of 780 nm laser diodes, optical data storage lenses should work well for light at a wavelength of $780 \pm 10$ nm. Undiffracted light, or light not diffracted into the right focal point, becomes unwanted stray light at the focal plane. As seen in FIG. 5, a 20 nm bandwidth centered on 780 nm does not appreciably decrease the diffraction efficiency.

By equating Eqs. (5a) and (5b), for the powers of a thin glass lens and a diffractive lens, Eq. (6) is obtained. Equation (6) is used to find the index of refraction with light at wavelengths other than the design wavelength.

$$\text{(a) } \phi_{th} = (n(\lambda) - 1)c \quad \text{(b) } \phi_{dif} = \frac{\lambda}{F\lambda_0} \quad (5)$$

$$n(\lambda) = \frac{\lambda}{\lambda_0}[(n\lambda_0) + 1] \quad (6)$$

One measure of how dispersive glasses are, that is, how much their index changes with change in wavelength, is the Abbe $v$-number formula, Eq. (7). Three wavelengths are picked, and their indices are substituted into Eq. (7), $$v = \frac{(n_m - 1)}{(n_s - n_l)} \quad (7)$$

where $n_s$, $n_m$ and $n_l$ are the indices of refraction for the short, middle, and long wavelengths. When evaluating glasses, the wavelengths chosen are usually $\lambda_s = 0.48613$, $\lambda_m = 0.58756$, and $\lambda_l = 0.65627$. For all glasses, the $v$ number for these three wavelengths is between 20 and 90. The lower the $v$ number, the further $n_s$ and $n_l$ are from each other, and the glass is more dispersive.

If Eq. (6) is substituted into Eq. (7), the Abbe $v$-number for a diffractive lens is found to be $$v_{diff} = \frac{\lambda_m}{\lambda_s - \lambda_l}. \quad (8)$$

If $\lambda_s$, $\lambda_m$, and $\lambda_l$ are chosen as above, then using Eq. (8), the $v$ number for a diffractive lens is found to be $$v_{diff} = -3.45 \quad (9)$$

This number has very important ramifications when achromatizing lenses.

The power of the refractive element is balanced with the power of the diffractive surface. The power of each element add to equal the desired power of the achromat, and the powers are also of the correct proportion so that the longitudinal chromatic aberration is zero. These power are given by $$\text{(a) } \phi_{ref} = \frac{v_{ref}\phi_{tot}}{v_{ref} - v_{diff}} \quad \text{b) } \phi_{diff} = \frac{v_{diff}\phi_{tot}}{v_{diff} - v_{ref}} \quad (10)$$

Where $v_{ref}$ and $v_{diff}$ are the $v$ numbers for the refractive and diffracted elements, $\phi_{ref}$ and $\phi_{diff}$ are the powers of the two elements, and $\phi_{tot}$ is the total power of the lens.

Once the required focal length for the diffractive surface is found, the zone spacing which results in this focal length is then determined as discussed in connection with FIGS. 3 and 4. Once the proper zone locations are determined, they are then fine tuned to minimize field (mono-chromatic) aberrations, as discussed in connection with FIG. 9.

Eq. (9), shows the $v$ number for a diffractive lens is $vd = -3.45$. Since the lowest $v$ number for glasses is about 20, the diffractive lens is found to be much more dispersive than any refractive lens. It is also seen to be negative, where all glasses are positive. Equations (10a) and (10b) can again be used to design a diffractive/refractive hybrid achromat with a focal length of 3 mm. Typical values for this lens are shown in Table 1 (typical values for a 3 mm focal length).

TABLE 1

| element | $n_m$ | $v$ number | power $\phi$ | % of total power $\phi$ (= 0.333/nm) |
| --- | --- | --- | --- | --- |
| LASF3 | 1.808 | 40.724 | 0.3073 | 92.2 |
| diffractive | 10,001 | −3.45 | 0.0260 | 7.8 |

Because of the unusually low, and negative, $v$ number for the diffractive surface, Table 1 shows a weak, positive diffractive element can be used to achromatize the lens. Since the powers of the two elements are no longer working against each other, the power in the refractive element is greatly reduced by using the diffractive surface. The advantage of having less power in the refractive element is a thinner lens with lower surface curvatures.

Because the refractive element is thinner, there is no bulky negative element. The diffractive/refractive hybrid achromat is heretofore much lighter than an achromat made from only glass. Additionally, because the surface curvature (FIG. 1) is not steep, the refractive element in the hybrid introduces lower monochromatic aberrations than would be present in an all glass achromat and high NA lenses are now practical.

The aspheric coefficients for surface 1, defined by Eq. (11), $$z = \frac{c\rho^2}{1 + \sqrt{1 - C^2\rho^2}} + D_4\rho^4 + D_6\rho^6 + D_8\rho^8 + D_{10}\rho^{10}, \quad (11)$$

where z is the surface sag from a x-y plane tangent to the surface, C is the surface curvature, $D_4$, $D_6$, etc. are the fourth, sixth, etc. aspheric coefficients, and ρ is a radial coordinate in the lens. An example of suitable coefficients is given in FIG. 9, along with the phase coefficients for the diffractive surface, defined in Eq. (3).

The lens shown in FIG. 1 focuses incoming light down to a spot and the measure of quality for the lens will be Strehl ratio. This is a ratio of the amount of energy at the center of the spot of light produced by the actual lens, to the amount of energy at the center of the spot if it were produced by an aberration-free lens. A Strehl ratio of 1.0, therefore, is theoretically the best possible.

Consider design wavelengths $\lambda_s=770$ nm, $\lambda_m=780$ nm, and $\lambda_1=790$ nm, and that the lens will be forming a point focus through a disc substrate 14 (FIG. 1), a plate of polycarbonate material. This is the disk substrate which must be taken into account with the lens design.

The laser diode may have center wavelength, for example, anywhere in the range between 770 nm and 790 nm. The lens must be achromatized for an 8 nm bandwidth around the center wavelength of each particular laser so that random wavelength fluctuations in the laser do not affect performance of the optical recording system. For example, the ratio of the focal length change to wavelength change should be less than 0.1 μm/nm. To account for possible errors in mounting the lens, the lens accommodates at least a one degree, 1° field of view. The Strehl ratio of the whole system is maintained equal to or above 0.9, and the lens itself above 0.96 over the full field of view.

The hybrid diffractive/refractive lens 10 is achromatized such that the focal length change per change in incident wavelength is less than 0.032 μm/nm. This exceeds the requirement for optical data storage.

Figure 6:
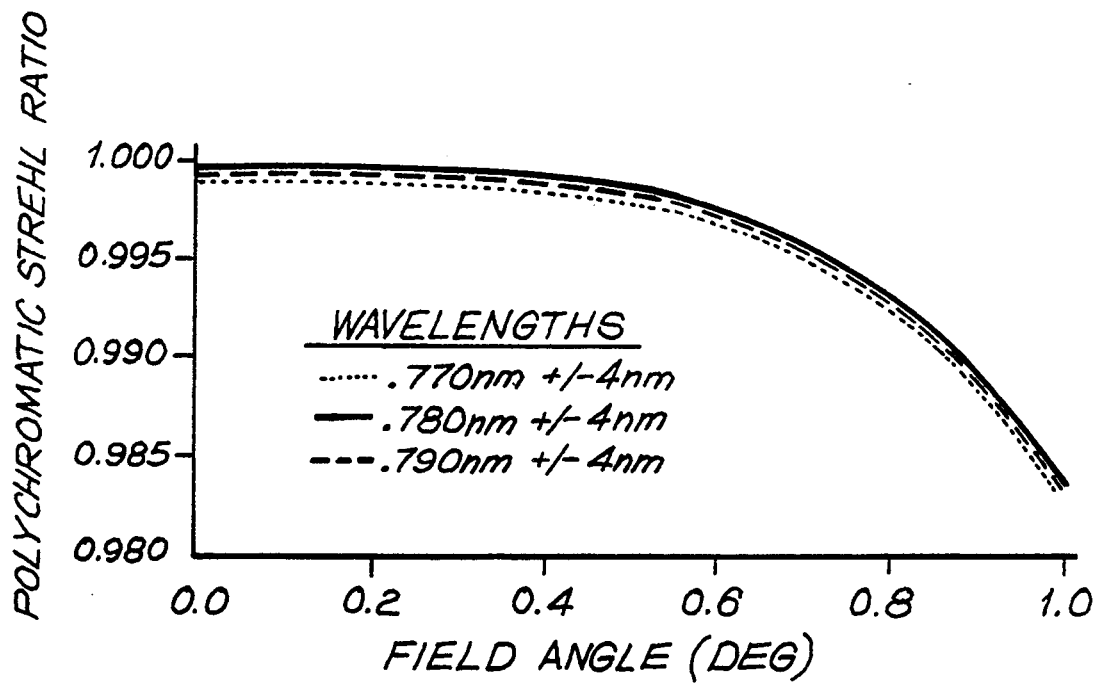
FIG. 6 is a plot of the polychromatic Strehl ratio for an 8 nm band-width around three possible center wavelengths of laser diodes, the center wavelengths and the ±4 nm wavelengths all being weighted equally.

FIG. 6 shows the lens design meets this requirement out to the full field, with a Strehl ratio well above 0.96, giving a margin for manufacturing tolerances.

Figure 7:
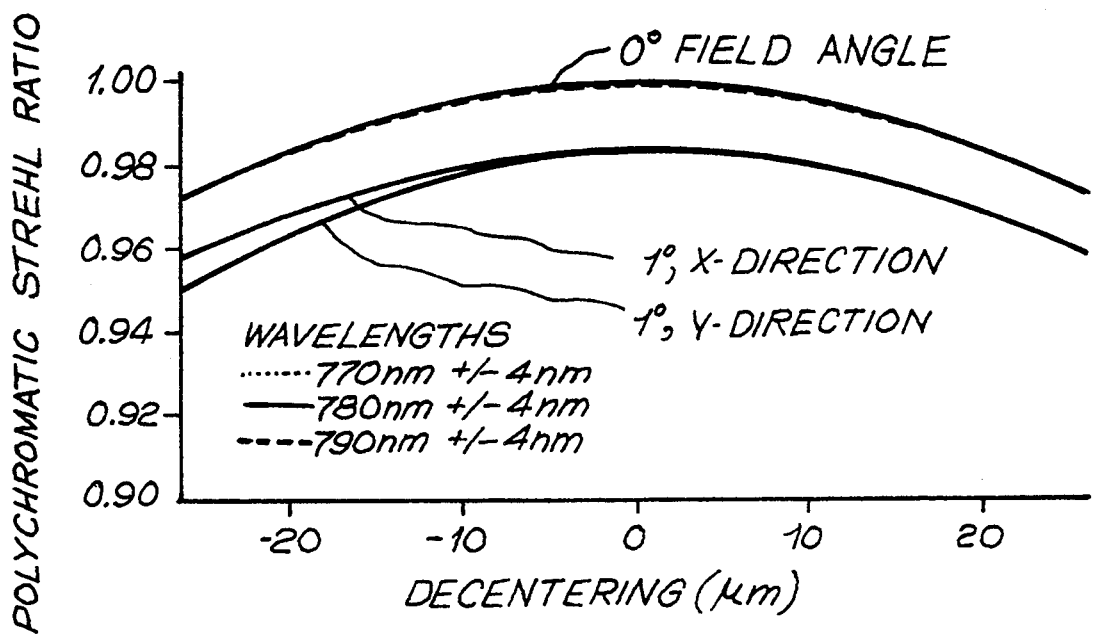
FIG. 7 is a plot of the polychromatic Strehl ratio as a function of diffractive surface decentering with decentering in the y direction, the x and y directions being orthogonal to each other in a plane perpendicular to the optical axis.

In addition to mounting alignment error, errors can also arise in lens manufacture. If the diffractive surface is not lined up exactly with the glass element, for example, the Strehl ratio will decrease in a manner shown in FIG. 7. FIG. 7 shows plots for both 0° and 1° field of view. For 0°, the Strehl ratio stays above 0.96 beyond 20 μm of decentering. At 1°, however, decentering must be kept under 20 μm.

Other possible manufacturing errors include glass element thickness, diffractive surface tilt, and diffractive surface focal length tolerance. The results for each tolerance taken separately, along with field angle and decentering, are shown in Table 2, and the characteristics of the exemplary lens are shown in Table 3.

TABLE 2

| error | decentering | glass element thickness | diffractive surface tilt | diffractive surface focal length |
|---|---|---|---|---|
| limit to maintain Strehl > 0.96 at 10 field of view | ±20 μm | ±35 μm | ±0.2° | ±3 mm |

TABLE 3

| N.A. | Focal length | Pupil diameter | Lens thickness | Working distance | Number of rings |
|---|---|---|---|---|---|
| 0.55 | 2.99 mm | 3.3 mm | 2.12 mm | 1.1 mm | 30 |

From the foregoing description, it will be apparent that the invention provides a diffractive/refractive hybrid achromat designed for use in an optical data storage head. Utilizing the thin and light characteristics of a diffractive lens, along with a dispersion opposite of ordinary glasses, a small light diffractive/refractive hybrid with an extremely high NA is obtained. The hybrid achromatic has tolerance limits within the requirements of optical recording, including a very small focal length shift per wavelength shift of incoming light. The diffractive surface minimize longitudinal chromatic aberration and spherical and coma in refractive element without the use of bi-aspheres. Variations and modifications within the scope of the invention will undoubtedly suggest themselves to those skilled in the art. Accordingly, the foregoing description should be taken as illustrative and not in a limiting sense.

We claim:

1. A hybrid refractive and diffractive achromat lens for optical data storage systems using a laser beam having a wavelength which can vary over a 20 nm wavelength range, which lens comprises a body of optically transmissive material having an index of refraction at a wavelength approximately in the center of said range of at least 1.65, said body having first and second surfaces on opposite sides thereof, said first and second surfaces being intersected successively by an optical axis of said lens which extends in a longitudinal direction, at least one of said surfaces being curved to provide a converging refractive element having power and longitudinal chromatic aberration, said lens having a converging diffractive element having power which substantially achromatizes said lens for said longitudinal chromatic aberration of said refractive element over said 20 nm range; and wherein said lens has an Abbe υ number, $\upsilon_{ref}$, of less than 50, and said diffractive element has an Abbe υ-number, $\upsilon_{diff}$ which is negative.

2. The lens according to claim 1, wherein said lens has a thickness not exceeding about 3.2 mm between said first and second surfaces, said at least one of said surfaces having a radius not exceeding about 4.0 mm and said lens having a focal length $\leq 5$ mm.

3. The lens according to claim 2, wherein $\upsilon_{diff}$ is about −3.45.

4. The lens according to claim 1, wherein said curved surface is said first surface and said second surface has a diffractive zone pattern defining said diffractive element.

5. The lens according to claim 1 wherein said lens had a numerical aperture (NA) of at least 0.45.

6. A hybrid refractive and diffractive achromat lens for optical data storage systems using a laser beam having a wavelength which can vary over a 20 nm wavelength range, which lens comprises a body of optically transmissive material having an index of refraction at a wavelength approximately in the center of said range of at least 1.65 said body having first and second surfaces on opposite sides thereof, said first and second surfaces being intersected successively by an optical axis of the said lens which extends in a longitudinal direction, at least one of said surfaces being curved to provide a converging refractive element having power and longitudinal chromatic aberration, said lens having a converging diffractive element having power which substantially achromatizes said lens for said longitudinal chromatic aberration of said refractive element over said 20 nm range, and wherein the power of the refractive element $\phi_{ref}$ and the power of the diffractive element $\phi_{diff}$ add to provide the total power $\phi_{tot}$ of the lens, are proportional such that the longitudinal chromatic aberration is approximately zero and are longitudinal chromatic aberration is approximately zero and are defined in accordance with the Abbe $v$-number $v_{diff}$ and $v_{ref}$ of the diffractive and refractive elements as follows:

$$\phi_{ref} = \left(\frac{D_{ref}}{D_{ref} - D_{diff}}\right)\phi_{tot} \text{ and}$$

$$\phi_{diff} = \left(\frac{D_{diff}}{D_{ref} - D_{diff}}\right)\phi_{tot}$$

* * * * *